C. T. BARTON.
BUTTER AND MILK MIXER.
APPLICATION FILED APR. 1, 1911.
1,003,319.
Patented Sept. 12, 1911.
2 SHEETS—SHEET 1.
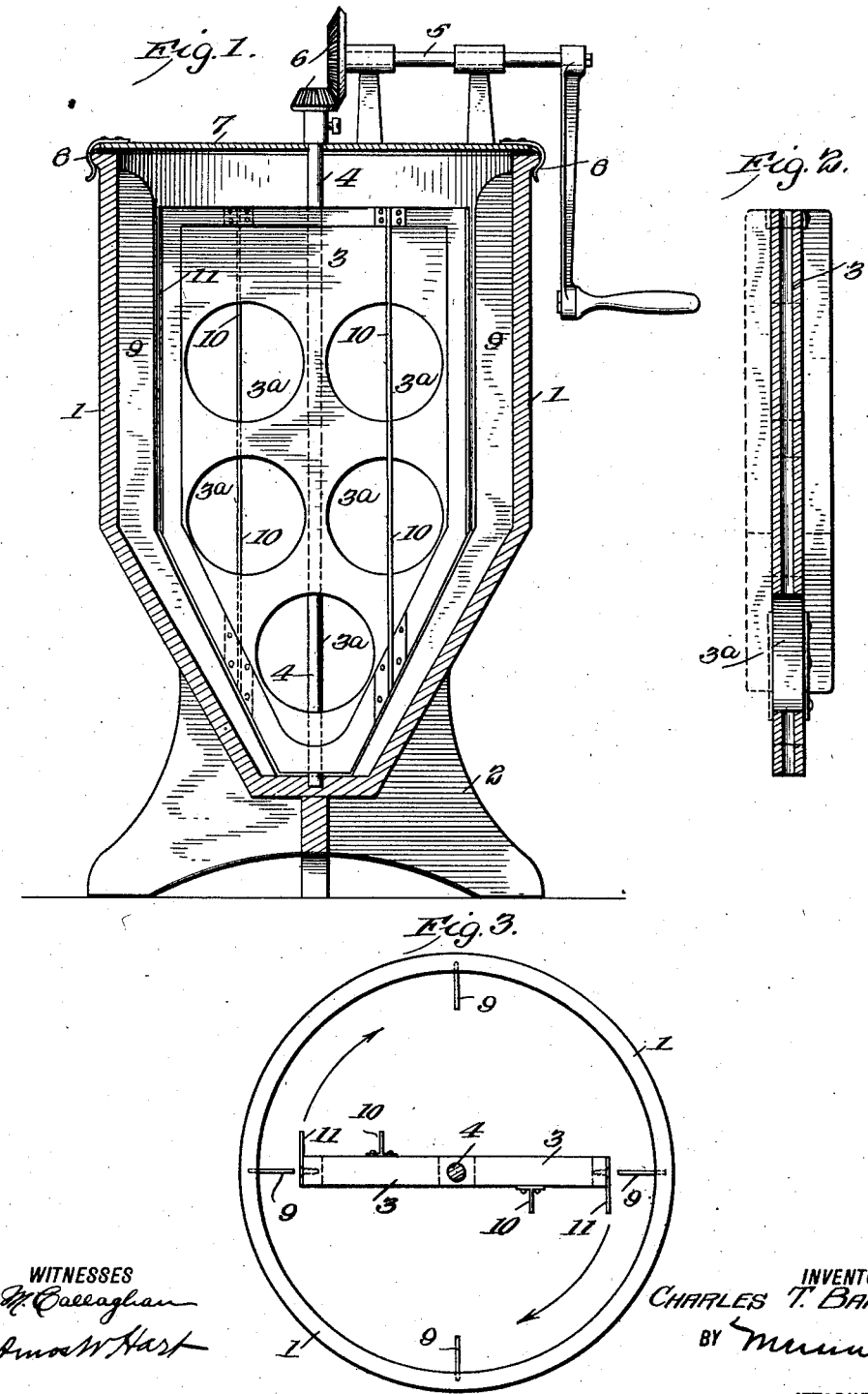
WITNESSES
INVENTOR
Charles T. Barton
BY
ATTORNEYS C. T. BARTON.
BUTTER AND MILK MIXER.
APPLICATION FILED APR. 1, 1911.
1,003,319.
Patented Sept. 12, 1911.
2 SHEETS—SHEET 2.
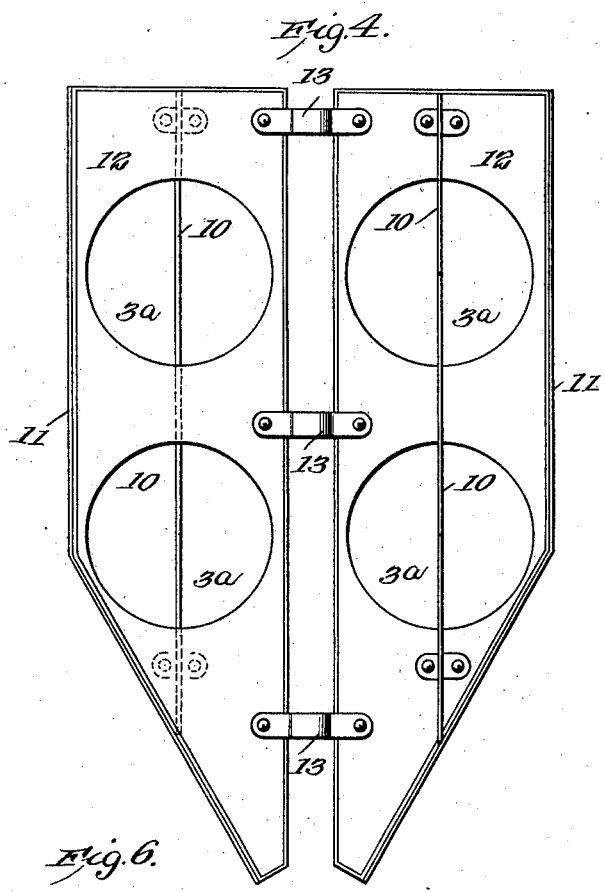
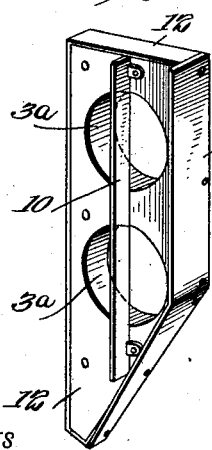
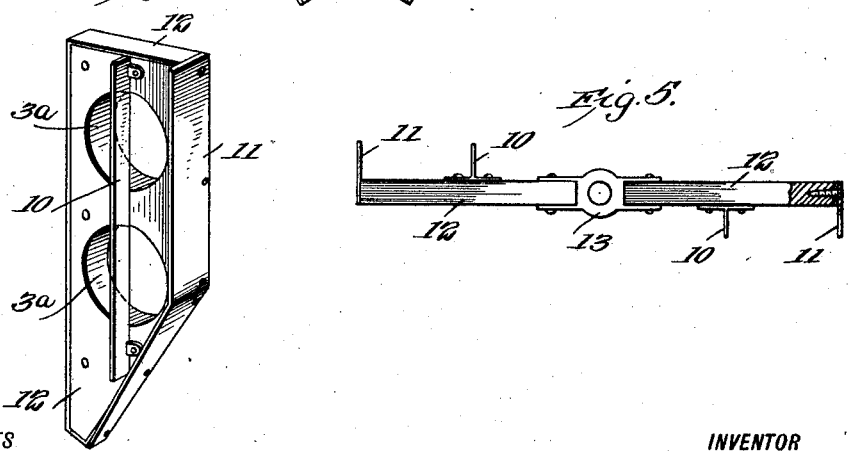
WITNESSES
INVENTOR
CHARLES T. BARTON
BY
ATTORNEYS

UNITED STATES PATENT OFFICE.

CHARLES TRUMAN BARTON, OF BUFFALO, NEW YORK.

BUTTER AND MILK MIXER.

1,003,319. Specification of Letters Patent. Patented Sept. 12, 1911.

Application filed April 1, 1911. Serial No. 618,332.

*To all whom it may concern:*

Be it known that I, CHARLES T. BARTON, a citizen of the United States, and a resident of Buffalo, in the county of Erie and State of New York, have invented an Improvement in Butter and Milk Mixers, of which the following is a specification.

My invention is an apparatus for cutting up butter and mixing or merging it with milk to form an improved butter compound.

The details of construction, arrangement, and operation of parts are as hereinafter described, and illustrated in the accompanying drawings, in which—

Figure 1 is a central vertical section of the apparatus. Fig. 2 is a vertical central section of the dasher provided with vertical cutters. Fig. 3 is a central horizontal section of the apparatus. Fig. 4 is a face view of a modified form of the dasher. Fig. 5 is a top view of such dasher. Fig. 6 is a perspective view of one of the wings or halves of the modified dasher.

I will first describe the apparatus as illustrated in Figs. 1, 2, and 3. The body 1 of the hollow receptacle is cylindrical in its upper portion and tapered in its lower portion, and the whole is supported upon a suitable base 2. A dasher 3 is mounted centrally upon a vertical rod or shaft 4, which is rotated by a crank-shaft 5, through the medium of bevel gearing 6. The dasher and shaft, together with the top or cover 7, are detachable, the cover being provided with spring clips 8 which are adapted to engage a ledge or rib formed on the upper end of the body 1. Within the body there is a series of plates 9 arranged vertically, and which, in view of their function, may be designated as baffles, or breakers. These baffles follow the contour of the body 1, as shown. The dasher has also the same contour on its sides. It is formed of a metal plate held in a suitable frame and provided with a series of large openings 3ª. On opposite sides of the dasher plate 3 and projecting in opposite directions are metal strips 10 which are secured in such position as to cross or traverse two of the openings diametrically. At the outer edge of the dasher another cutter 11 may be attached. Thus there are vertical cutters 10 on diagonally opposite sides or faces of the dasher.

The operation of the apparatus may now be understood. A quantity of butter and milk is first placed in the body 1, the proportions being preferably one pint of milk to one pound of butter, and the dasher is then operated for the purpose of cutting up the butter and working them together, so as to merge them and form practically one substance, or a butter compound which becomes solid the same as butter proper. By turning the crank shaft 5, the dasher will obviously be driven, that is to say, rotated, and, as indicated in Fig. 3, the cutters will meet and divide the lumps of butter floating in the liquid, and the divided portions will for the most part pass through the openings 3ª along with the streams or currents of liquid. A distinct and important advantage is obtained by arranging the cutters in front of the openings, since the openings are thus left practically free; whereas, in dashers of this class in which wires are arranged in the openings, the latter soon become clogged and wholly or partly closed, so that they are practically useless.

In the modification shown in Figs. 4, 5, and 6, the dasher is divided vertically or constructed in two similar parts 12 which are rigidly connected by cross-pieces 13, that are, in practice, adapted for attachment to an actuating shaft. Each of the halves 12 of this dasher is provided with openings 3ª and cutters 10 and 11, the same as in the form of my invention first described.

The cutters or knives 10 and 11 may be constructed of any suitable thin metal, such as steel, or of nickeled tin, and they will preferably be provided at the base with out-turned flanges or with a thickened portion constituting a reinforce, whereby their rigidity and solidity are promoted.

The holes 3ª in the dasher are preferably placed about three-quarters of an inch from the outer edge of the plate or body.

What I claim is:—

The improved apparatus for the purpose specified, comprising a receptacle, a rotatable shaft and a dasher attached thereto and comprising flat plates arranged on opposite sides of the shaft and in the same plane and provided with a series of openings, and vertical cutters secured to the face of each plate and projecting laterally therefrom, the same being formed of thin and narrow metal strips which extend diametrically across the openings, as shown and described.

CHARLES TRUMAN BARTON.

Witnesses:
 MAE R. MARTIN,
 W. J. O'HARA.

Copies of this patent may be obtained for five cents each, by addressing the "Commissioner of Patents, Washington, D. C."